United States Patent
Heintz et al.

(10) Patent No.: US 9,365,728 B2
(45) Date of Patent: Jun. 14, 2016

(54) MODIFIED CARBON NANOTUBES AND METHODS OF FORMING CARBON NANOTUBES

(75) Inventors: Amy M. Heintz, Delaware, OH (US); Steven Risser, Reynoldsburg, OH (US); Joel D. Elhard, Hilliard, OH (US); Bryon P. Moore, Dublin, OH (US); Tao Liu, Tallahassee, FL (US); Bhima R. Vijayendran, Kuala Lumpur (MY)

(73) Assignee: Battelle Memorial Institute, Columbus, OH (US)

( * ) Notice: Subject to any disclaimer, the term of this patent is extended or adjusted under 35 U.S.C. 154(b) by 1260 days.

(21) Appl. No.: 12/282,173

(22) PCT Filed: Mar. 9, 2007

(86) PCT No.: PCT/US2007/006138
§ 371 (c)(1),
(2), (4) Date: Feb. 1, 2009

(87) PCT Pub. No.: WO2008/054473
PCT Pub. Date: May 8, 2008

(65) Prior Publication Data
US 2009/0142581 A1    Jun. 4, 2009

Related U.S. Application Data

(60) Provisional application No. 60/780,607, filed on Mar. 9, 2006, provisional application No. 60/871,824, filed on Dec. 24, 2006.

(51) Int. Cl.
*B32B 9/00* (2006.01)
*C09D 5/24* (2006.01)
*B82Y 30/00* (2011.01)
(Continued)

(52) U.S. Cl.
CPC . *C09D 5/24* (2013.01); *B82Y 30/00* (2013.01); *B82Y 40/00* (2013.01); *C01B 31/0253* (2013.01); *C01B 31/0273* (2013.01); *C03C 17/007* (2013.01); *C03C 17/22* (2013.01); *C03C 17/3441* (2013.01); *C09D 7/1216* (2013.01); *H01B 1/04* (2013.01); *C01B 2202/28* (2013.01);
(Continued)

(58) Field of Classification Search
CPC ............ C01B 2202/00; C01B 2202/22; C01B 31/022–31/0293; Y10T 428/30
USPC ................... 428/408; 423/447.1, 447.2, 448; 165/185; 977/742
See application file for complete search history.

(56) References Cited

U.S. PATENT DOCUMENTS 7,122,165 B2 * 10/2006 Wong et al. ................. 423/447.2
7,713,508 B2    5/2010 Curran
(Continued)

OTHER PUBLICATIONS

Sham (Surface functionalities of multi-walled carbon nanotubes after UV/Ozone and TETA treatment) Carbon 44 (2006) 768-777 (available online Nov. 2, 2005).*
(Continued)

*Primary Examiner* — Daniel H Miller
(74) *Attorney, Agent, or Firm* — C. Michael Gegenheimer; Frank Rosenberg

(57) ABSTRACT

In this invention, processes which can be used to achieve stable doped carbon nanotubes are disclosed. Preferred CNT structures and morphologies for achieving maximum doping effects are also described. Dopant formulations and methods for achieving doping of a broad distribution of tube types are also described.

27 Claims, 5 Drawing Sheets

(51) Int. Cl.
  *B82Y 40/00* (2011.01)
  *C01B 31/02* (2006.01)
  *C03C 17/00* (2006.01)
  *C03C 17/22* (2006.01)
  *C03C 17/34* (2006.01)
  *C09D 7/12* (2006.01)
  *H01B 1/04* (2006.01)
  *C08K 3/04* (2006.01)

(52) U.S. Cl.
  CPC ............... *C03C 2217/42* (2013.01); *C08K 3/04* (2013.01); *Y10T 428/25* (2015.01); *Y10T 428/30* (2015.01)

(56) References Cited

U.S. PATENT DOCUMENTS

| | | | |
|---|---|---|---|
| 7,834,545 | B2 | 11/2010 | Zhang |
| 7,913,541 | B2 | 3/2011 | Serban |
| 7,923,922 | B2 | 4/2011 | Geohagen |
| 2004/0253741 | A1* | 12/2004 | Star et al. ...................... 436/150 |
| 2005/0147553 | A1* | 7/2005 | Wong et al. ................. 423/447.2 |
| 2006/0121185 | A1* | 6/2006 | Xu et al. .................... 427/163.1 |
| 2007/0004231 | A1* | 1/2007 | Maehashi et al. ............. 438/795 |

OTHER PUBLICATIONS

Official communication from European patent office 07867014.8; Mailed Jan. 23, 2012.
Written Opinion from PCT/US2007/006138.
Dettlaff-Weglikowska et al: "Effect of SOCl2 treatment on electrical and mechanical properties of a single-wall carbon nanotube networks" J. Am. Chem. Soc., vol. 127, No. 14, 2005, pp. 5125-5131.
Ferrer-Anglada n et al: "Synthesis and characterization of carbon nanotube-conducting polymer thin films", Diamond and Related Materials, vol. 13, 2004, pp. 256-260.
Kavan n et al: "Electrochemical tuning of electronic structure of single-walled carbon nanotubes" J. Phys. Chem. B 2001. pp. 10764-10771.
Shakalova n et al: "Electrical and mechanical properties of nanocomposites of single wall carbon nanotubes with PMMA" Synthetic Metals 152. 2005. pp. 349-352.
Shakalova n et al: "Effect of chemical treatment on electrical conductivity, infrared absorbtion, and raman spectra of single-walled carbon nanotubes" J. Phys. Chem. B 2005. pp. 7174-7181.

* cited by examiner

MODIFIED CARBON NANOTUBES AND METHODS OF FORMING CARBON NANOTUBES

RELATED APPLICATIONS

This application is a national stage filing and claims the priority benefit of PCT/US07/06138 filed Mar. 9, 2007 and also claims the priority benefit of U.S. Provisional Patent Application No. 60/780,607, filed Mar. 9, 2006 and U.S. Provisional Patent Application No. 60/871,824, filed Dec. 24, 2006.

STATEMENT OF GOVERNMENT RIGHTS

This invention was made under a CRADA No. NFE-06-00133 between Battelle Memorial Institute and UT-Battelle, LLC management and operating Contractor of the Oak Ridge National Laboratory for the United States Department of Energy. The Government has certain rights in this invention.

BACKGROUND OF THE INVENTION

The present invention relates to the preparation of flexible, optically transparent and electrically conductive coatings and layers based on carbon nanotubes.

Carbon nanotubes (CNTs) are a class of nano-materials that have the potential to provide a variety of new, and previously unattainable, combinations of properties to materials. One emerging area for the use of carbon nanotubes is solution-processed, flexible and durable, conductive coatings. Carbon nanotubes can be dispersed in a medium and processed by conventional solution processing methods to yield flexible/durable, conductive layers. Such processes, if desired, may also produce transparent, flexible/durable, conductive layers. Another emerging area for using carbon nanotubes is in the fabrication of conductive polymer composites. Carbon nanotubes can be dispersed in a polymer matrix to yield a conductive polymer composite that retains the mechanical and processing properties of the polymer.

Because of their high electrical conductivity, nanometer diameters, high aspect ratios, and high degree of flexibility, carbon nanotubes are ideal materials for the preparation of transparent conductive films and coatings. Starting from highly dispersed nanotube inks, nanotube network films can be prepared on flexible or rigid substrates by various solution processing methods. Flexible transparent conductors prepared from single walled (SWNTs) and multi-walled (MWNTs) carbon nanotubes have been reported. SWNTs have smaller diameters than MWNTs (approx. 1 nm versus 30 nm) and may produce coatings having more desired qualities.

Currently, conductive coating of carbon nanotubes have been produced and used as antistatic coatings and for electromagnetic shielding. However, additional potential uses for conductive coatings using carbon nanotubes include touch screens for computers and other video terminals, flat panel displays, and as a substitute for expensive indium tin oxide coatings. There remains a need in the art to provide carbon nanotube coatings having both higher degrees of optical transmission in combination with higher electrical conductivities.

One approach that shows promise in improving both the electrical conductivity and optical transmission of carbon nanotube coatings is by adding chemical reactants that p-dope or n-dope the carbon nanotubes, A variety of p-type and n-type dopants have been explored, including $Br_2$, $I_2$, and $O_2$ as p-type and K, Cs, and Na as n-type.

Thionyl chloride has been shown to yield substantial improvements in the conductivity of SWNTs. (Skakalova et al J Phys Chem B 2005, 109, 7174 and Dettlaff-Weglikowska et al J. Am. Chem. Soc. 2005, 127, 5125). Thionyl chloride has benefits compared to prior art doping agents such as $Br_2$, Cs, and K, in that it is substantially less reactive and easier to handle. Thionyl chloride is used commercially in lithium-thionyl chloride batteries. Roth and co-workers showed that SWNT powders or bucky papers treated with liquid thionyl chloride for 24 h at 45° C. showed conductivity increase by up to a factor of 5. However, their results indicate that the treatment is less effective for larger diameter SWNT, such as those obtained by arc discharge and laser ablation processes. In addition, the reaction time is prohibitively long for use in-line during processing of carbon nanotube coatings.

There remains a need for doping processes that are suitable for a variety of CNT structures, fast, and yield stable doped structures.

BRIEF SUMMARY OF THE INVENTION

In a first aspect, the invention provides a solid carbon nanotube (CNT) composition, comprising: carbon nanotubes, at least 0.5 wt % S and at least 0.5 wt % Cl. The solid CNT composition exhibits a tangential mode (TM) position with a peak maximum between 1593 to 1605 $cm^{-1}$ (more preferably, 1595 to 1600 $cm^{-1}$) in the Raman spectrum.

In a second aspect, the invention provides a method of treating CNTs that has six alternative steps which could occur either alone or in any desired combination. This method comprises: providing CNTs, and contacting the CNTs with a doping agent; and further characterized by at least one of the following: (1) exposing the CNTs to a UV treatment (preferably this treatment is conducted in the presence of oxygen); or (2) introducing defects into the CNTs such that they exhibit a G/D ratio in the range of about 14 to about 22 prior to adding a doping agent; or (4) exposing the CNTs to oxidative plasma treatment prior to or simultaneous with adding the doping agent; or (5) exposing the CNTs to electron beam irradiation prior to or simultaneous with adding the doping agent; or (6) using a catalyst to catalyze the doping step. In practice, any one or any combination of these six alternatives could be used to treat CNTs.

In another aspect, the invention provides a multi-layer structure comprising a substrate, a storage layer, and a doped CNT layer in direct contact with the storage layer. The invention also provides methods of making this structure. In a further aspect, the multi-layer structure is protected with an encapsulating coating that stabilizes the doped CNT layer.

Various embodiments of the invention provide a variety of advantages, including: the ability to form transparent, conductive carbon nanotube films; conductive carbon nanotube thin films of 500 nm or less (in some cases, 200 nm or less); conductive carbon nanotube thin films with conductivity of 10,000 S/cm; methods of preparing substantially completely doped carbon nanotubes that are stable to environments such as oxygen, dry air, humid air, solvent washing, ultraviolet light, or heat exposure; carbon nanotube films having improved near infrared (NIR) transmittance; increased work function of CNT surfaces; and/or decreased junction resistance of CNT networks.

Other features and advantages of the present invention will be apparent from the following detailed description and accompanying figures.

DETAILED DESCRIPTION

Figure 1:
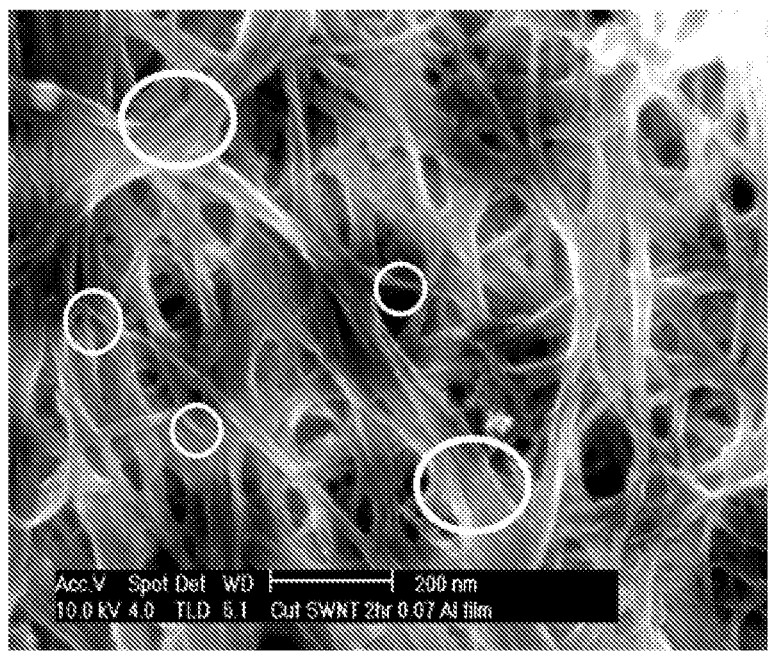
FIG. 1. SEM image of a sample prepared from cut nanotubes containing a mixed morphology of bundles (small circles) and belts (large circles).

The Figure of Merit (FOM) for a transparent conductor is related to the ratio of the electrical conductivity ($\sigma$) to the absorption coefficient ($\epsilon$) for given frequencies (FOM=$\sigma/\epsilon$). CNTs can be made with dramatically greater electrical conductivity (e.g. greater than 10-fold improvement) as well as improved optical transmission (lower absorption coefficient) by shifting of band gaps and Fermi level filling at the conductive band edge.

The approach outlined in this invention involves methods that improve the diffusion of dopants into CNT structures, the adsorption of dopants onto CNT structures, the redox reaction to yield CNT-dopant charge transfer complex, and the stability of charge transfer complex. CNTs are often bundled, or exist in tightly grouped structures such as ropes and ribbons. A bundle is defined as a CNT morphology consisting of more than 7 CNTs agglomerated in a single bundle of substantially aligned tubes. A rope is defined as multiple CNTs packed together in an orderly manner with a quasi-circular crossection, and a belt is bundled CNT structures with a flat, ribbon-like structure. The methods of this invention provide carbon nanotube structures and assemblages of carbon nanotubes structures (morphology) that are tailored for highly efficient doping.

A doping agent is an agent that modifies the electronic structure of carbon nanotubes by depleting (p-doping) or filling (n-doping) valence band electronic states. Dopants are electron acceptor or electron donor molecules that form charge-transfer complexes with carbon nanotubes. In this invention, doping is preferably carried out to deplete the density of states of the semi-conducting nanotubes. The appropriate doping agent depends on the bandgap of the semi-conductor. The reduction potential is one measure of a doping agent's capacity to reduce or oxidize nanotubes with specific bandgap structures. Other measures include the electron affinity and ionization energy. Preferred dopants for this invention are p-type dopants with reduction potential in the range of 0.20 to 2.90 versus the standard hydrogen electrode (SHE), more preferably 0.20 to 1.30. One way to determine the electron affinity is by quantum mechanical calculations, where the energy of the lowest unoccupied molecular orbital (LUMO) can be related to the electron affinity. In another preferred mode, the dopants have negative LUMO, less (larger negative values) than about −0.2 eV, preferably less than −2.0 eV. Thionyl chloride is the most preferred p-type dopant. Examples of appropriate doping agents include phosphoryl chloride, selenium oxychloride, iodine monobromide, aurous chloride, $SO_2$, $(CNS)_2$, and $(IrCl6)^{2-}$.

One measure of the doping effect is the ratio of the electrical sheet resistance of the film before and after the doping. Other measures of the doping effect include spectroscopic measures that are described below.

The diffusion of a doping agent into CNT structures can be carried out by treating CNT structures with gaseous or liquid doping agent. One preferred process is to treat thin film structures with liquid doping agent. For efficient doping, thin film structures (500 nm or less) are preferred over powders and bucky papers due to their higher surface area that allows rapid diffusion of the doping agent into the structure. By using thin carbon nanotube films, doping can be achieved almost immediately (less than 10 seconds) at room temperature with thionyl chloride liquid. In some cases, doping can be achieved with neat liquids, such as neat thionyl chloride; alternatively, solutions containing dopant can be used, in some embodiments, high concentrations are useful, for example a solution containing at least 60 wt % dopant. Minor improvements in the doping effect are observed for treatment time up to about 30 minutes at room temperature. Optionally, CNT powders and bucky papers can be doped by treating with gaseous thionyl chloride.

Although not required, it is preferred that the carbon nanotubes and any glassware or processing equipment should be substantially free from moisture and oxygen. This can be accomplished by heating the carbon nanotubes in the doping apparatus at high temperature (>300° C.) under vacuum. Alternatively, the carbon nanotubes may be dried using typical drying agents such as $P_2O_5$. It may also be desirable to degas the thionyl chloride prior to use. This can be accomplished by any known means such as sparging with inert gas or successive freeze-pump-thaw cycles under successive open and closed vacuum. The latter is preferred as it removes residual dissolved gases such as HCl and $SO_2$ that could act as competing, but less effective dopants.

Wetting of the nanotubes by the dopant can be further enhanced by treating the surface of the nanotube with oxidative plasma, ozone or introducing various defects. Examples of defects that may be introduced are those known in the art, including both end-site, defect-site, and side-wall modification, for example arising from acid treatment, ozonation, oxidation, reductive alkylation, radical addition, fluorination, gamma irradiation, electron beam irradiation, Bingel reaction, 1,3-dipolar addition, diazotization, nitrene cylcoaddition, nucleophilic addition, hydrogenation, dichlorocarbene addition, and alkylation.

For some types of carbon nanotubes, we surprisingly found the introduction of defects improved the doping effect. It is believed that the addition of defects into highly perfect CNTs improves the ability of the doping agent to wet the CNT. In addition, the formation of charge transfer complexes may occur preferentially at certain defect sites.

Doping can improve the performance of all CNTs, even heavily covalently-modified ones. For CNT networks with the same volume fraction and thickness, doping according to this invention will yield the same, and sometimes lower, minimum sheet resistance for samples containing a small number of defects compared to those containing no defects.

The ratio of the G band and D band in the Raman spectrum is an indicator of the CNT perfection. (Itkis, M. E.; Perea, D. E.; Jung, R.; Niyogi, S.; Haddon, R. J. Am. Chem. Soc. 2005, 127, 3439) In the Raman spectrum of carbon nanotubes, the G-band (G+, G−) is a tangential shear mode (TM) of the carbon atoms and occurs in the region from approximately 1450 $cm^{-1}$ to 1650 $cm^{-1}$. The D band is a second order process, and is often called a defect mode. The intensity of the G band and D band are determined by integration of Raman spectra recorded at one or more excitation frequencies. This G/D ratio can have some dependence on the nanotube distribution and the excitation frequencies chosen. This is because the Raman scattering observed for carbon nanotubes samples is usually associated with resonant Raman effects, where the consequence of the laser energy being in resonance with electronic transitions results in a significant increase in the intensity observed. Since the electronic transitions of carbon nanotubes depend on the structure of CNT, different populations of CNTs are selectively excited by using different laser excitation. A zone-folding scheme or Kataura plot should be used to determine the appropriate laser excitation to observe average population of carbon nanotubes for the diameter range present. (Kataura, H.; Kumazawa, Y.; Maniwa, Y.; Umezu, I.; Suzuki, S.; Ohtsuka, Y.; Achiba, Y. Synthetic Metals 1999, 103, 2555). In some cases, it is useful to employ multiple lasers. In this invention, the G/D ratio is obtained based on the average of spectra obtained using at least two laser frequencies.

The preferred G/D ratio for optimal doping according to this invention is greater than 8, and more preferably greater than 14. In some embodiments, the G/D ratio is between 8 and 40, in some embodiments between 12 and 25, in some embodiments between about 14 and about 18.

The term "carbon nanotubes" or "CNTs" includes single, double and multiwall carbon nanotubes and, unless further defined includes bundles and other morphologies. Suitable carbon nanotubes include single-wall carbon nanotubes prepared by HiPco, Arc Discharge, CVD, and laser ablation processes; double-wall carbon nanotubes (DWNTs), single double triple wall carbon nanotubes, few walled, and multi-wall carbon nanotubes, as well as covalently modified versions of these materials. The CNTs can be any combination of these materials, for example, a CNT composition may include a mixture of single and multiwalled CNTs, or it may consist essentially of DWNT and/or MWNT, or it may consist essentially of SWNT, etc.

Other preferred structures include mixtures of SWNT, DWNT, and/or MWNT. The performance properties may be enhanced through proper selection of individual carbon nanotube diameter (Å), SWNT chirality index (n,m), the number of walls (S, D, T, MWNT (5-19)), inherent "waviness" of SWNT versus "rod-like" coaxial (D, T, MWNTs). The proper selection of the linear combination of wall diameters will produce different in-phase versus out-of phase photonic band structures with higher visible (450-750 nm) transmission and lower scattering contributions. Solid CNT compositions of the present invention preferably contain at least 20 weight % CNT, more preferably at least 70 wt %, and still more preferably at least 90 wt % CNT. The volume fraction of films or other CNT compositions is preferably at least 10% CNTs, more preferably at least 40%, and in some embodiments 20 to about 60%; preferably, the remainder of the volume is substantially air, or, in some embodiments, a polymeric encapsulant.

The proper selection of linear combination of wall diameters will also produce different in-phase versus out-of phase electronic band structure with higher conductivity at frequencies of interest (e.g., DC-RFI shielding and lower scattering contributions). A longer effective electron-hole lifetime produces higher conductivity in the network. The proper selection of linear combination of wall diameters also produces different conductivities, with larger diameters yielding a smaller band gap.

The proper selection of linear combination of wall diameters also produces a different effective FOM, by tuning density, volume fraction, weight fraction, and aspect ratio through a combination of different tube types. The selection of linear combination of wall diameters (1-20) modifies the tendency of the nanotubes to exfoliate, disperse, re-associate, form random networks, form ordered networks, and form patternable networks. This behavior can be controlled to form either homogeneous or epitaxially structured multiphase materials with substrates above or beneath the transparent conductive CNT layer.

To observe a doping effect, a charge transfer complex must be formed. The majority of carbon nanotube starting materials that are commercially available contain a mixture of CNT types that have different band gaps. During treatment with the doping agent, the narrow band gap nanotubes are the easiest to dope. Higher reduction potentials are needed to dope the wider band gap CNTs. This is in contrast to the results reported in the prior art (Skakalova et al J Phys Chem B 2005, 109, 7174 and Dettlaff-Weglikowska et al J. Am. Chem. Soc. 2005, 127, 5125).

The reduction potential of thionyl chloride is 0.61 versus the standard hydrogen electrode (SHE). This potential is sufficient to oxidize nanotube populations with diameter of approximately 1.0 nm and greater. The reduction potential of thionyl chloride can be increased through the use of redox catalysts such as metallo phthalocyanine such as cobalt phthalocyanine, or metal halides such aluminum trichloride and copper chloride. The catalyst can also help to facilitate the interaction and electron transfer between CNT and dopant. A catalyst may be added to the dopant (which could be a liquid or solution) at a preferred concentration ranging from 0.001 M to 1.0 M. Catalysts can also be used in gas phase reactions. This solution can then be used to treat CNT structures. Alternatively, the CNT composition, such as a CNT film, may first be treated with a solution containing the catalyst, dried, and then exposed to thionyl chloride liquid or other doping agent. The concept of using a redox catalyst is expected to yield positive results with other dopant systems as well. "Doping catalysts," as that term is defined in this application, does not include residual catalysts remaining in the CNTs from CNT synthesis. Further, by definition, doping catalysts result in a significant increase in doping or doping rate (preferably at least a 30% increase under optimized doping conditions). Furthermore, the doping catalysts are present as dissolved matter in the dopant, dopant solution, or dopant mixture, or as a thin coating applied to the CNT surface; the latter can be observed by electron microscopy as a coating on the CNTs. These states differ from residual CNT catalyst particles that are present as insoluble spherical particles often present inside the CNTs or as random particulate within the sample. In general the concentrations needed for catalyzing the redox reaction result in loadings much higher than are found as residual catalyst arising from the CNT.

Another method of achieving doping of broad CNT bandgap distributions is to use mixtures of dopants. Since the narrow bandgap CNTs are the easiest to dope, the use of stronger doping agents to achieve depletion in the larger bandgap tubes can result in over-depleting (over doping) the narrow bandgap tubes. Over-doping can cause a decrease in the conductivity of the CNT. The use of mixtures avoids overdepleting the narrow bandgap carbon nanotubes while allowing depletion of the large band gap nanotubes. Mixed dopants can be applied using a sequential approach, where the CNT structure is treated sequentially with two or more dopants.

In one mode, the doping effect of thionyl chloride can be enhanced by first exposing CNT films with UV-light. In some embodiments, this treatment is conducted in air. CNT films are first treated with UV-light, for example, 254 nm. Preferably, the UV treatment is for at least 10 minutes; in some embodiments for times ranging from 10 minutes to 3 hours. Exposure times of less than 60 minutes are preferred. A UV treatment is applied by a UV lamp. "UV treatment" as a flux of UV light greater than room conditions ambient and is sufficient to increase the extent of doping.

The doping effect is greatest in carbon nanotube networks that are close to the percolation threshold. The percolation threshold is the critical concentration of CNT that must exist for a conductive path to exist across the sample. De-bundling, or exfoliation, of single-walled carbon nanotubes is desirable to decrease the loading at which percolation occurs and to increase the role of metallic tubes. Exfoliation of CNTs can be accomplished through application of linear combinations of mechanical, ultrasonic, viscoelastic, osmotic, cryogenic, and chemical treatments. One approach to de-bundling uses mechanical means. For example, particle size reduction for spherical particles is often accomplished via grinding media and mechanical agitation (attrition). This approach is also useful for high aspect ratio CNTs if nano-filament media such as SiC, BN, polymers (e.g. PMMA, which can be thermally unzipped), polycrystalline coated materials, or 2D platelets of proper hardness are used. In particular, higher density MWNTs (~20 nm diameter and various lengths) can be used as effective exfoliation media for smaller diameter bundles as long as the diameter ratio is 20:1 or greater and the mode of application of shear is controlled to be along the axial bundle dimension, so that there is not rotary dispersion as with spheres but longitudinal shear as in orifices, homogenizers, and extruders. Any of these techniques can be used in the methods of the present invention.

Another approach to de-bundling uses chemical means. For example, small molecular or oligomeric species can be infused in between the CNT-CNT bundles. These probes interact strongly with the surface at the cut end of the nanotubes and migrate along the axial direction-unzipping the bundle along the way. Once infused, these components can be subjected to chemical or physical transformations that give rise to expansion of the CNT bundles to the point of exfoliation (rupture). This process is related to thermo-oxidative exfoliation during purification involve the oxidation of encased Fe catalyst residues by conversion to FeO— the change in density is expected to break open amorphous carbon deposits and allow the Fe to be extracted by HCl as opposed to $HNO_3$. Our approach utilizes these catalyst residues, but in this case they promote our chosen chemical/biochemical/photochemical transformations that will result in even more effective nanotube bundle exfoliation. Infusion of species (like water) which have a decrease in density upon freezing or other critical temperature/pressure transitions can also be used to rupture the bundles. As with other descriptions herein, one or more of these techniques can be used to treat CNTs to define a method of the present invention.

The CNT-dopant complexes are desired to be stable. Certain CNT morphologies exhibit improved stability over others. The charge-transfer complex is stabilized in certain carbon nanotube morphologies, such as bundled ropes and belts, and also by the number of junctions. For achieving highly transparent conductive CNT films, it is known that the overall degree of bundling should be minimized and the number of junctions should be low. One preferred morphology is a CNT film containing a bundled CNT fraction, where the bundles are >10 nm in diameter. In some preferred embodiments, a CNT composition has at least 10 mass % bundles, in some embodiments at least 25 mass % bundles.

Another preferred morphology comprises linear combinations of CNTs of appropriate and distinct morphology. For example, after debundling, the semiconducting SWNTs fraction (⅔) can be redistributed in new rebundles composed of small diameter D-T-MWNTS so as to mitigate (soften) their effect on the conductivity of metallic SWNTs and their effect on creating effective band gaps by associating in bundles and rebundles of similar wave function symmetry. Effective rebundles form as the nanotubes reassociate at different rates due to different colloidal interactions and colligative property effects e.g., zeta potential, density, diameter, Van der Waals interactions, London Dispersion Forces, etc. By controlling the higher order network formation of these B,RB to form both structural scaffolds, high conductivity highways, and fine structure filaments, the electron/hole conductivity and optical transparency can be maximized. In some preferred embodiments, a CNT composition has at least 10 mass % bundles, in some embodiments at least 20 mass % bundles.

Another preferred morphology is the belt morphology. One way to prepare a belt structure is to use a mixture consisting primarily of substantially shortened (<200 nm) carbon nanotubes. Carbon nanotube networks prepared from shortened carbon nanotubes yield belt structures that can exhibit higher bulk conductivity than corresponding structures prepared from super-ropes. At the same time, these structures contain a high concentration of junctions and can be used to create a tortuous path to diffusion and increase the stability of charge-transfer complexes. In some preferred embodiments, a CNT composition has at least 10 mass % belts, in some embodiments at least 20 mass % belts.

The CNT compositions of the present invention may have a bulk conductivity greater than 300 S/cm; in some embodiments, a bulk conductivity in the range 300 S/cm to 50,000 S/cm; in some embodiments, a bulk conductivity in the range of 300 to 10,000 S/cm; and in some embodiments, a bulk conductivity in the range of 2000 to 5000 S/cm. For films, the CNT film preferably has a film thickness greater than 20 nm, in some preferred embodiments a thickness less than 500 nm, and in some embodiments less than 200 nm. Film thickness greater than 20 nm and CNT volume fraction greater than 0.40 are preferred for improved dopant stability. High dopant stability provides samples with electrical properties stabilized to moisture, oxygen, and solvent washing. Desirably, after treatment, the CNTs are air stable. In some preferred embodiments, the CNTs are in the form of a film and the treatment decreases sheet resistance by at least 8 times (in some embodiments about 10 to about 30 times) and the resulting film is air-stable—meaning that its conductivity does not degrade by more than 5% after 1 week of exposure of the treated CNTs to room temperature air.

In another preferred mode, a thin storage layer may be formed on or applied to a substrate. A CNT film is disposed in direct contact with the thin storage layer. In this invention, a "storage layer" refers to a layer that absorbs a doping agent, trapping the doping agent and allowing it to interact with the CNT film over extended periods of time. Preferably the storage layer contains less than 5 wt % doping agent, Preferred trapping polymer layers should have semi-crystallinity, and/or moderate Tg, chemically or physically crosslinked structure, high transparency, and polar functional groups that can interact with dopants such as thionyl chloride. By controlling the combination of semi-crystallinity (a type of physical crosslink), chemical crosslink density, physical crosslink density, and Tg, the diffusion of doping liquid into the storage layer can be controlled. The diffusion of doping agent into the storage layer should be limited so as to prevent swelling of the layer, which may lead to yellowing and/or loss of transparency in the layer. In one preferred mode, diffusion of the doping agent is limited to first 50 nm of the surface of the storage layer that is in-contact with the CNTs. In some embodiments, the thickness of a storage layer is 50 nm or less, in some embodiments the thickness of the storage layer is between 10 and 100 nm. In another preferred mode, functional groups that react with thionyl chloride are avoided. A preferred type of storage layer comprises a polymer. Suitable polymers include (but are not limited to) polyester resins, acrylic resins, epoxy resins, poly(ethylene terephthale), poly (butylene terephthalate), poly(methyl methacylate), polycarbonate, poly(ether ether ketone). Composites filled with absorbent particles such as pillared clays, mesoporous particles, vesicles, organogels may also be used. The surface of the storage layer may optionally treated by processes known in the art to improve the wettability of the substrate. Storage layers comprise at least 0.0001 wt % of doping agent, more preferably at least 0.001 wt %; more preferably at least 0.1 wt %; in some embodiments up to 5 wt %.

Storage layers can be formed in the surface of a substrate. Thus, the storage layer can be formed of the same type of polymer as the substrate. For example, the first 50 nm of the surface of a substrate can be modified by incorporating a doping agent. In some preferred embodiments, there is less than 0.01 wt % of dopant in the first 50 nm of the substrate's surface. Alternatively, the substrate and storage layer can be composed of different materials. Storage layers may also be applied to transparent substrates by any method known in the art such as spin coating, screen printing, spraying, gravure printing, inkjet printing. In one preferred mode of the invention, the CNT layer is deposited on top of the storage layer and treated with the dopant. In another preferred mode, the storage layer may be treated with the dopant prior to CNT film deposition. It is also envisioned that the dopant may be present in the storage layer when it is formed. The doping agent in the storage layer can operate in at least two ways, in some cases the trapped dopant interacts with the CNTs, in other embodiments, the trapped dopant is latent until it is released into the CNT layer.

The substrate, upon which a storage layer is disposed can be, for example, a glass or polymer. Nonlimiting examples of polymers include: poly(ethylene terephthalate), poly(ethylene napthalate), polycarbonate, and poly(methyl methacrylate), high performance engineered films such as polyethersulfones, poly(ether ether ketone), polyarylenes, poly(cyclic olefin copolymer), and combinations thereof. A preferred substrate is transparent to light in the visible, IR, and/or near IR. Preferred transparent substrates include ZnS, ZnSe, sapphire, Ge, Si, or combinations thereof.

The presence of an encapsulating protective layer such as an oligomeric or polymeric layer in contact with the CNT film after doping can stabilize the doping effect. Thionyl chloride is strongly adsorbed on/in carbon nanotube networks and should remain active as long as subsequent side-reactions (e.g. hydrolysis to $SO_2$ and HCl) can be prevented. While not being bound by theory we believe that chemisorbed thionyl chloride is relatively more stable to hydrolysis when compared to free thionyl chloride, due to the specific binding of the sulfonyl group to the surface. This provides opportunities for stabilization of the thionyl chloride carbon nanotube charge transfer complex through secondary treatment with a small amount of encapsulation material. The encapsulant prevents direct moisture contact and renders the adsorbed thionyl chloride essentially stable against hydrolysis. Suitable encapsulants would include hydrophobic polymers, copolymers such as those composed of aliphatic hydrocarbons, especially those which provide enhanced moisture barrier properties such as perfluorinated and perchlorinated polymers like polyvinylidene chloride (PVdC), or PTFE. Self-assembled monolayer compounds may also stabilize a doped film. In preferred embodiments, an encapsulating layer is disposed over the doped CNT layer such that the doped CNT layer is sandwiched between the storage layer and the encapsulant.

The term encapsulation in the field of carbon nanotube doping traditionally refers to trapping of dopant moieties inside of the carbon nanotube itself via endohedral doping, such as in pea-pod structures, rendering them more air and moisture-stable. This type of insertion has been limited to very small cations in isolated, open tubes under extreme conditions. In our invention, however, the term refers to exohedral doping, on the outer surface and intersticies of the CNTs and network, respectively. Encapsulation in the field of carbon nanotube field effect transistors (FET), as with traditional electronic device manufacture, refers to the deposition of a protective or insulating layer over the conductive layer, e.g. by molecular beam epitaxy (MBE) using chemical vapor deposition or other methods.

By way of contrast, in the context of this invention, the encapsulant serves to sequester the dopant molecule, further reducing any thermal desorption, while simultaneously providing external barrier protection from moisture infusion. This approach is more closely related to protecting electronic devices from signal distortion effects of atmospheric moisture (e.g. perylene C). It is important that the encapsulant not disturb the charge transfer properties of the dopant-carbon nanotube complex, so that electron-rich halogenated materials may be particularly effective. If desired, additional functionality may be incorporated into the encapsulant to alter the carrier injection or hole-transport properties of the interface (e.g. transition metal complexes).

The work function of a CNT network can be controlled by either selectively doping to improve or deactivating (through covalent modification) semiconducting CNTs (bundled or rebundled) of particular effective band gap.

EXAMPLES

Example 1

HiPco SWNT (CNI, Purified Grade) were dispersed in 0.62 wt % sodium dodecylbenzene sulfonate in D2O by tiphorn sonication. The concentration of nanotubes in the dispersion was 5.5 mg/L. Transparent thin films were deposited on substrates by one of two methods.

Film Method 1. The dispersion (6 g) was passed through a 0.02 µm Anodisc filter and washed with water. The resulting CNT mat was released from the filter by dipping the coated Anodisc filter into water, causing the CNT mat to release from the filter and float on the water. The floating CNT mat was picked-up with a glass substrate.

Film Method 2. The dispersion (6 g) was passed through a 0.02 µm mixed cellulose ester filter and washed with water. The resulting CNT mat was transferred to PET by: placing the CNT mat in contact with a sheet of PET, applying heat (80° C.) and pressure (<10,000 psi) for 15 minutes, removing the mixed cellulose ester from the PET by carefully peeling or swelling with acetone, and then washing the coated PET with acetone.

Samples were then exposed to one of three doping treatments.

Liquid Treatment 1. Samples were immersed in a container of liquid thionyl chloride for a fixed period of time, between 10 seconds and 1 h (see Table below), maintained under moisture-free conditions. Samples were removed from the liquid, washed with methylene chloride, and then dried with a stream of air.

Comparative Liquid Treatment 2: Samples were immersed in a container of liquid thionyl chloride for 12 h at 45° C., maintained under moisture-free conditions. Samples were removed from the liquid, washed with methylene chloride, and then dried with a stream of air.

Gas Treatment 1. Samples were placed in a flame-dried vacuum flask with a container of liquid thionyl chloride (samples not in contact with liquid). The thionyl chloride was degassed by at least three freeze-pump-thaw cycles. The system was placed under closed vacuum, warmed to room temperature, and held for either 3 hours or 3 days. At the conclusion of the experiment, the system was opened to atmospheric pressure. Samples were removed, washed with methylene chloride, and then dried with a stream of air.

Samples were characterized before and after treatment using 4-point probe (Jandel Universal Probe), Raman spectroscopy (LabRAM ARAMIS Raman confocal microscope with multiple laser excitation at 785, 633, or 532 nm operating at 2 cm$^{-1}$ spectral resolution), and UV-Vis-NIR spectroscopy (Cary 17 UV/VIS/Near IR spectrometer). Sheet resistance was determined by the average of a minimum of two points, changing the orientation of the sample and position of the probe between points. The percent transmittance was determined at 550 nm relative the appropriate substrate. The results for samples prepared by Film Methods 1 and 2 using different thionyl chloride treatment methods is shown in Table 1.

TABLE 1

Results of treating HiPco SWNT structures with thionyl chloride

| | Before Treatment | | | | After |
|---|---|---|---|---|---|
| Sample | Film Method | Sheet Resistance (Ω/square) | % T at 550 nm | Treatment | Treatment Time | Treatment Sheet Resistance (Ω/square) |
| | 1 | 511 | 70.0 | Gas 1 | 3 h | 274 |
| | 1 | 511 | 70.0 | Gas 1 | 72 h | 334 |
| | 2 | 532 | 74.0 | Liquid 1 | 10 sec | 159 |
| | 2 | 532 | 74.0 | Liquid 1 | 2 min | 133 |
| | 2 | 532 | 74.0 | Liquid 1 | 10 min | 116 |
| | 2 | 532 | 74.0 | Liquid 1 | 20 min | 115 |
| | 2 | 493 | 72.0 | Liquid 1 | 20 min | 114 |
| | 2 | 532 | 74.0 | Liquid 1 | 40 min | 112 |
| | 1 | 521 | 73.2 | Liquid 1 | 1 h | 176 |
| | 1 | 966 | 74.3 | Liquid 1 | 1 h | 171 |
| | 1 | 504 | 73.2 | Liquid 2 | 12 h | 185 |

The best results were observed for samples treated by Liquid Method 1. A treatment time of 10 seconds was sufficient to decrease the sheet resistance from 530 Ω/square to 159 Ω/square. Increasing the treatment time yields further decrease in the sheet resistance, but after treatment times greater than 10 minutes, little or no decrease in resistance was observed. Surprisingly, treatment of samples at high temperature for longer time using Comparative Liquid Treatment 2 did not provide any advantages over the shorter, milder Liquid Treatment 1 procedure. In fact, the properties may actually degrade with this more aggressive treatment. In preferred methods of the present invention, CNT compositions are treated with liquid thionyl chloride for about 40 min or less, preferably about 20 min or less, more preferably about 10 min or less, in some embodiments from about 10 seconds to about 10 minutes. Treatment is preferably carried out at less than 40° C., more preferably at room temperature.

The composition of the doped CNT structures obtained according to this invention is characterized by substantially complete reduction of the van Hove singularities arising from the first transitions of the semiconducting tubes ($v_s^1 \rightarrow c_s^1$). SWNTs exhibit of optical bands in the near-infrared (NIR) region at ~0.7 eV (~1500-1700 nm) and ~1.2 eV (~900-1100 nm) associated with band-gap transitions in semiconducting nanotubes, and a third optical band at ~1.8 eV associated with metallic SWNTs. Higher levels of doping are expected to reduce the optical bands of the lower energy states first, followed by the intermediate bands. At extremely high levels of doping even the metallic bands in the visible region around 700 nm become reduced.

Figure 2:
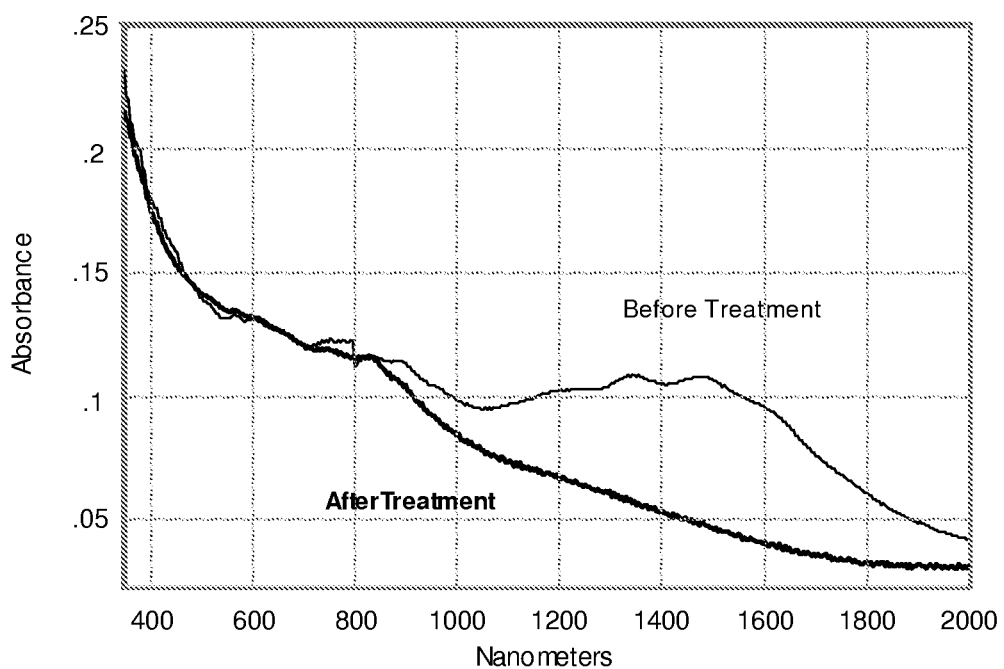
FIG. 2. Vis-NIR absorbance spectrum of a HiPco SWNT on glass, before and after treatment with liquid thionyl chloride.

Substantially bleached, in this invention, refers to the substantial disappearance of the semiconducting optical bands associated with the $v_s^1 \rightarrow c_s^1$ for a given CNT population. For HipCo CNTs that have an average diameter of 0.9 nm, these transitions are observed in the NIR near 1500 nm. The characteristic features of a substantially doped CNT film are shown in FIG. 2. Before doping, the relative intensity and sharpness of the $v_s^1 \rightarrow c_s^1$ transitions are dependant on the state of dispersion, presence of defects, pH, etc. After beneficial doping, the intensity of these modes decreases to the background phonon dispersion baseline for carbonaceous materials. High levels of covalent functionalization of the carbon nanotube, or other treatments that damage or destroy the electronic structure of the semiconducting carbon nanotubes are excluded from consideration in this discussion.

The doped compositions exhibit a substantial increase in the NIR transmission as shown in FIG. 2.

The composition of the doped CNT structures obtained according to this invention is further characterized by changes in the Raman spectrum, specifically associated with changes in the overall intensity, shape, and position of bands.

As mentioned, the Raman scattering observed for carbon nanotubes samples is usually associated with resonant Raman effects, and different populations of CNTs can be selectively excited by using different laser excitation. To observe characteristic features of doped carbon nanotubes, it is preferable to examine spectra of the semi-conducting nanotubes. A zone-folding scheme or Kataura plot should be used to determine the appropriate laser excitation to observe the semiconducting tubes for a given nanotube diameter distribution. In some cases, it is useful to employ multiple lasers.

Before each measurement and between laser line shifts, the optical paths should be re-aligned and the frequencies calibrated. The Raman shift should be calibrated with a standard such as cyclohexane. Optical path alignment is calibrated using Silicon.

For accurate measurements, sample heating effects due to laser power heating must be avoided. The resonance frequencies are dependant on temperature. In our measurements, all spectra are measured using thin film carbon nanotube networks, laser power less than 5 mW, and low magnification; no sample heating effects were observed. In addition, the influence of material inhomogeneity and scattering should be minimized through a combination of multiple measurements carried out on one sample and the use of homogeneous carbon nanotubes networks or dispersions.

Figure 3A:
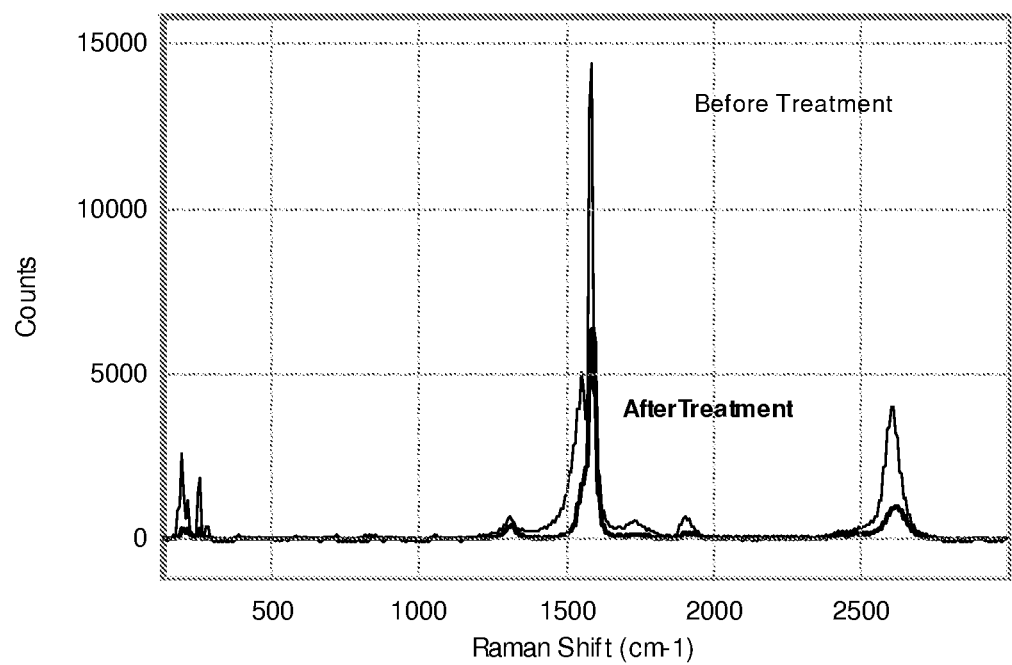
FIGS. 3a and 3b. Raman spectrum (633 nm) of HiPco SWNT on glass, before and after treatment with thionyl chloride.
Figure 3B:
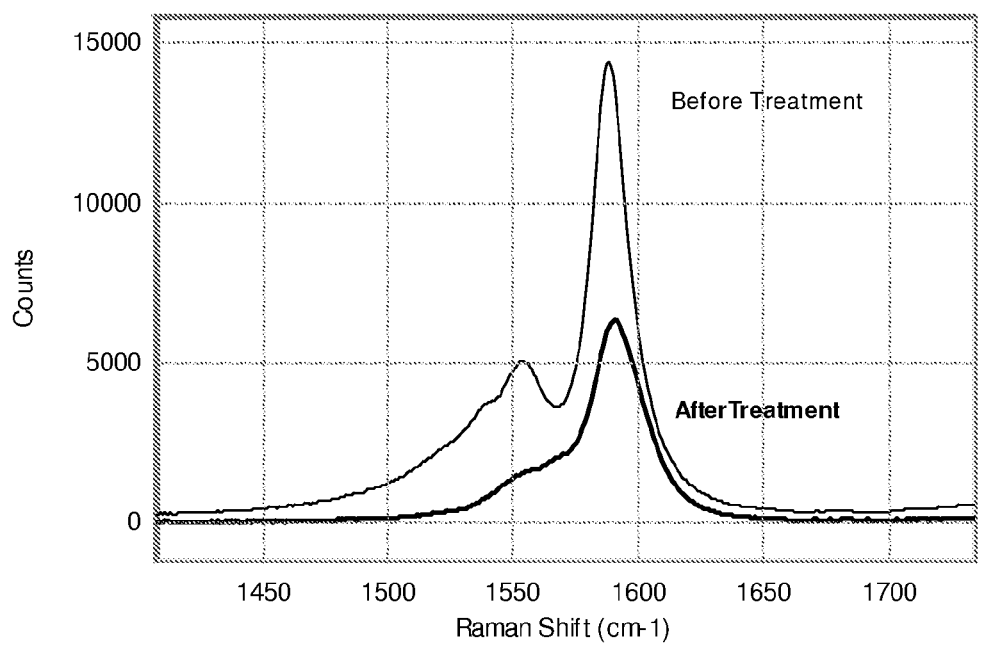

The Raman spectra (633 nm laser) of a HiPco SWNT film before and after treatment is shown in FIG. 3. There is an overall decrease in the intensity of the spectrum. The TM modes between 1400 to 1700 cm$^{-1}$ (G$^+$, G$^-$) exhibit significant changes in shape and position after doping. The position of maximum intensity for the TM mode before doping is 1588 cm$^{-1}$. After doping, the position increases to 1591 cm$^{-1}$. The shape changes observed upon doping are associated with changes in the Breit-Wigner-Fano line shape of the G− band, related to the changes in electron-hole pairs that accompany doping.

At 633 nm, the Raman spectrum of HiPco SWNT contains a contribution from the metallic tubes. For a cleaner interpretation of the changes in the semiconducting HiPco SWNTs (average diameter=0.9 nm), the Raman spectrum at 785 nm (1.58 eV) excitation is more appropriate. Using 785 nm excitation, the position of maximum intensity for the TM mode before doping is 1592 cm$^{-1}$. After doping, the position is shifted to 1595 cm$^{-1}$.

In this invention, when reference is made to the TM mode, we are referring to the TM bands observed between 1450 to 1650 cm$^{-1}$ for the representative average of the semi-conducting population, and the position of this bands maximum intensity. Other changes that occur upon doping, such as shape, bandwidth, and overall intensity are relevant, but less quantifiable. The position of TM for semiconducting tubes that is characteristic of these doped CNTs is found the range of 1593 to 1605 cm$^{-1}$ in some modes of the invention, and 1595 to 1600 cm$^{-1}$ for other modes of the invention. The discussion does not refer to the position for measurements on individual nanotubes but on collections of nanotubes as in nanotube networks, composites, and powder.

Example 2

Gas Treatment 2. A vial containing 1 mg of DWNTs prepared by catalytic decomposition of methane (obtained from Professor CJ Lee at Korea University) was placed in a large glass vacuum tube and dried at 300° C. overnight. The system was placed under vacuum while still hot and held overnight. The flask was opened to atmosphere and 1.5 mL of SOCl$_2$ was added to the bottom of the flask. The system was degassed by three successive freeze-pump-thaw cycles, then closed under vacuum, brought to room temperature, and held for 3 days. The sample was removed from the flask and a small amount was dispersed in dichlorobenzene by tiphorn sonication for 20 minutes. The resulting dispersion was dark and translucent. Two samples were prepared by passing 7 mL or 3 mL of the dispersion on a 0.02 μm Anodisc filter. A control sample was also prepared from dichlorobenzene dispersion.

The sheet resistance was evaluated after air drying for 2 days. The samples were then placed in 10% water in acetone and stirred overnight. Samples were dried and characterized.

| Sample | Sheet Resistance (After Air) (Ω/square) | Sheet Resistance (After H$_2$O/acetone) (Ω/square) |
|---|---|---|
| Control 8 mL | 17,680 | 33,280 |
| SOCl2 7 mL | 1,678 | 2,626 |
| SOCl2 3 mL | 9,462 | |

The results show that the thionyl chloride doped sample exhibited improved stability as compared to the control. This can be seen where the control exhibited a larger percent change in resistance after an overnight soak in acetone/water.

Example 3

Glass slides were coated with a thin layer (<1 Mm) of PET by spin coating from solution. Arc SWNTs were deposited on the coated layer using Film Method 1.

Glass slides were coated with a thin layer (<1 Mm) of trimethylolpropane triacrylate (Sartomer SR351 HP) by spin coating from solution. The coating was UV-cured. DWNT (Helix, CVD) were dispersed in 0.62 wt % SDBS in H2O by tiphorn sonication, and then deposited on the coated glass slides using Film Method 1.

Both samples were treated with thionyl chloride using Liquid Treatment 1.

The presence of polymeric storage layers in contact with CNT film improves the doping effect. Compared to neat glass substrates, coated substrates yield up to 2 fold greater decrease in the sheet resistance. Thionyl chloride is capable of diffusing into the polymer structures without dissolving, degrading, or yellowing the polymer. It is believed that the thionyl chloride can be trapped in these layers, where it can continue to interact with CNTs, yielding significantly improved doping and doping stability.

Example 4

SWNT films were prepared on glass substrates using film method 1. Sheet resistance (ohms/square) was measured and optical spectra of the films were obtained from 350 nm-2000 nm. The films had ~85% T at 550 nm and initial sheet resistance of ~18,000 ohms per square. The films on glass were doped by depositing droplets of liquid thionyl chloride on the substrate. Excess liquid was removed and the sheet resistance and optical spectra were obtained. The resistance had decreased to ~1600 ohms/square (~12-fold improvement). The optical spectra showed a complete loss of the near-IR bands for the van-Hove transitions of the semi-conducting SWNTS. The thionyl chloride-doped SWNT films were then treated with two different candidate encapsulants.

Encapsulant treatment 1 involved spraying the surface with a small amount of a PTFE-containing aerosol REN RP-79.

Encapsulant treatment 2 involved spin coating of a fluoropolymer solution CTX-109A (Asahi) composed of Cytop polymer dispersion over the top of the SWNT film.

The optical transmittance and surface resistivity of the films were periodically monitored. After an extended period of time, films encapsulated by both treatments maintained a high degree of conductivity improvement with steady state resistance values of ~3800 Ω/square for the Encapsulant treatment 1 and ~1800 Ω/square for the Encapsulation treatment 2.

There are several criteria involved in selection of an appropriate encapsulant. The encapsulant and its solvent should not interact with the dopant, ideally the dopant is insoluble, or only slightly soluble in the encapsulant or its solvent, and the encapsulant should act as a barrier to water, or other environmental factors which would degrade the performance of the dopant.

It is envisioned that the encapsulant may also be used in conjunction with a polymeric storage layer to enhance the doping performance. The storage layer stores a doping agent that increases conductivity of an adjacent film of CNTs. Typically, the storage layer is a polymer or contains absorbent particles such as clays. When the encapsulant is used in conjunction with a polymeric storage layer, the encapsulant and its solvent must also not interact with the polymer of the storage layer, and preferably would not substantially swell the polymeric storage layer.

Example 5

Arc Discharge SWNT (Carbon Solution, P-2) were dispersed in dichlorobenzene by tiphorn sonication for 30 minutes. The concentration of nanotubes in the dispersion was 150 mg/L. The dispersion was sprayed onto quartz slides using an aerosol spray gun. Some of the samples were placed in a quartz tube furnace, degassed by successive vacuum evacuation/Ar purging, placed under Ar atmosphere, and treated at 900° C. for 4 h.

Both heat-treated and non-heat treated samples were treated with thionyl chloride using Liquid Method 1 for 30 minutes. Optionally, some of the samples were first exposed to low power UV at 254 nm in air using a Model UVGL-23 Mineralight Lamp. Exposure times were varied between 15 minutes and 12 h. After UV exposure, samples were treated with thionyl chloride.

All samples were characterized prior to thionyl chloride doping with 4-point probe, Vis-NIR spectroscopy, and Raman spectroscopy and again after doping 4-point probe, Vis-NIR spectroscopy, and Raman spectroscopy.

Brief exposure of thin film samples to 254 nm treatment in air results in an improvement in the doping effect. This is primarily observed in the decrease in the sheet resistance, compared to the pristine state. Exposure times less than 3 hours give the best effect. At longer exposure times, Raman spectroscopy indicates that the doping effect is still enhanced; however, the competitive effect of adding significant defects to the CNTs causes a competing increase in the sheet resistance.

Exposure to UV in air increases the bulk conductivity of SWNTs that have undergone high temperature treatment. Analysis of the TM mode in the Raman spectrum suggests that the heat treated samples that have been exposed to UV in air are more p-doped. The use of this mixed dopant system is more effective than use of thionyl chloride alone.

The defect content for CNTs exposed to heat-treatment and/or UV-treatment was quantified using the ratio of the G-mode to D-modes in the Raman spectra. For these arc discharge CNTs, the ratio was determined based on the average from spectra obtained using 532 nm and 633 nm excitation. As expected, upon exposure to 254 nm treatment, the G/D ratio decreased. In air, UV exposure facilitates ozonation of CNTs. Samples that underwent a high temperature heat treatment exhibited higher G/D ratios.

For comparison of changes in electrical properties for different samples, the samples were normalized by their absorbance at 550 nm. The ratio of the sheet conductance to the absorbance is proportional to the Figure of Merit for transparent conductors. Prior to any doping, the pristine Arc SWNT exhibited a sheet conductance to absorbance ratio of 0.0016. After optional exposure with UV and treatment with thionyl chloride by Liquid Method 1, this ratio increased, up to 0.0129, a factor of 8-fold improvement.

Figure 4:
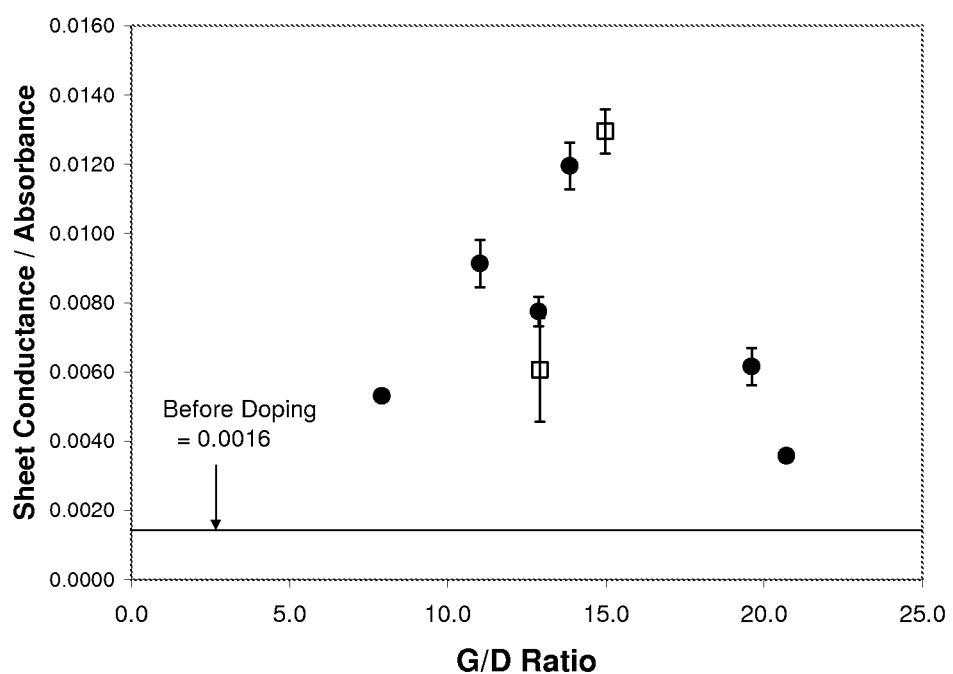
FIG. 4. A plot showing the change in sheet conductance/absorbance observed upon doping Arc SWNT with different G/D ratios. Open symbols=as received SWNTs; Closed symbols=heat treated SWNTs.

A plot of sheet conductance/absorbance versus the G/D ratio is shown in FIG. 4. The doping effect is found to be greatest for Arc SWNT with a G/D ratio in the range of 14 to 16. Thus, the combination of heat treatment and UV exposure in air can be used to optimize the G/D ratio for the film, so as to produce the best Figure of Merit after doping.

The G/D ratio is an average of the defects of all tube types. It has been shown that smaller diameter tubes are generally more reactive than large diameter tubes. It is thus expected that the defects are concentrated on smaller diameter tubes. The smaller diameter tubes have larger bandgaps. The introduction of defects onto these tubes may facilitate formation of charge transfer complexes. The type of defect, including the type of bond to C, substitutions on the defect, and isomer (1,2-substitution versus 1,4-substitution) determine the overall enhancement observed.

Example 6

Dispersion A. HiPco SWNT (CNI, Purified Grade) were dispersed in 0.62 wt % sodium dodecylbenzene sulfonate in D2O by tiphorn sonication. The concentration of nanotubes in the dispersion was 5.5 mg/L. The dispersion was then centrifuged at 66,000 g for 30 minutes. The supernatant was used to prepare films on PET using Film Method 1. Six different films were prepared using different known volumes of dispersion. In parallel, six films with the same composition were prepared on Silicon wafer; similarly, six films were prepared on Pyrex wafer.

Dispersion B. HiPco SWNT (CNI, Purified Grade) were dispersed in 0.62 wt % sodium dodecylbenzene sulfonate in D2O by tiphorn sonication. The concentration of nanotubes in the dispersion was 5.5 mg/L. Films were prepared on PET using Film Method 1. Five different films were prepared using different known volumes of dispersion. In parallel, five films with the same composition were prepared on Silicon wafer; similarly, five films were prepared on Pyrex wafer.

The SWNT film thickness was determined by a combination of ellipsometry (single wavelength), prism waveguide coupler, and optical transmission measurements. The reason for doing so is because each technique has its own limitation for accurately determining the thin film thickness. For example, single-wavelength ellipsometry is very sensitive to the surface quality of the measured thin film, and also it is subjected to multiple solutions in case that both optical constants and thickness of the film are unknown. Conventional prism wave-guide coupler is limited to relatively thick and transparent samples (~a few micron) for simultaneous determination of both the refractive index and thickness. Multi-wavelength/Normal incidence transmission for film thickness determination relies on the interference pattern being observed, which is also limited to relatively thick film samples.

The combined method used in this invention for determining SWNT thin film thickness is summarized as follows.

SWNT film samples with identical compositions as those deposited on PET for doping experiments were prepared on Silicon wafer and Pyrex wafer. The optical constants for each substrate are known. The values used for our calculation is: silicon (3.85+0.02i @ 633 nm) and pyrex (1.471 @ 633 nm). In the multilayer structure of Si wafer, SiO2 layer thickness was determined to be 2 nm by single-wavelength ellipsometry using the known refractive index value of 1.46.

The SWNT film samples were prepared in-parallel on Si and Pyrex wafer. Therefore, in the combined optical method, we assume that the thickness and the optical constants for SWNT thin film on either substrate are the same.

Single-Wavelength Ellipsometry (633 nm). In the geometry for this measurement, the incident laser beam with known polarization state (phase difference and amplitude ratio between TE (s) and TM (p) eigenstate) impinges on the sample at a fixed incident angle, and the polarization state of the reflect beam was determined. $\Psi$ and $\Delta$, as given by the equation below, which are the output quantities from the ellipsometry measurements, contain information on the optical constants and film thickness of the multilayer structures.

$$\tan\Psi e^{i\Delta} = \frac{r_p}{r_s}$$

$$\tan\Psi = \frac{A_p^r / A_s^r}{A_p^i / A_s^i}$$

$$\Delta = (\delta_p^r - \delta_s^r) - (\delta_p^i - \delta_s^i)$$

Ψ and Δ for the SWNT film sample on both Si-wafer and Pyrex-wafer are measured at 3 different incident angles (30°, 50°, and 70°). The data is compiled in the following format for later use.

$$\text{Ellip\_Data} = \begin{bmatrix} 30 & \Delta_{30}^{Si} \\ 50 & \Delta_{50}^{Si} \\ 70 & \Delta_{70}^{Si} \\ 30 & \Psi_{30}^{Si} \\ 50 & \Psi_{50}^{Si} \\ 70 & \Psi_{70}^{Si} \\ 30 & \Delta_{30}^{Pyrex} \\ 50 & \Delta_{50}^{Pyrex} \\ 70 & \Delta_{70}^{Pyrex} \\ 30 & \Psi_{30}^{Pyrex} \\ 50 & \Psi_{50}^{Pyrex} \\ 70 & \Psi_{70}^{Pyrex} \end{bmatrix}$$

UV-Vis Transmission (633 nm). UV-Vis transmission measurement was carried out on the SWNT film sample on Pyrex wafer. During the measurement, no control sample (Pyrex) but only the air was used as the reference. The transmission values at the selected wavelength (633 nm), which can be theoretically determined using the generalized Fresnel equations if the optical constants and sample thickness of each layer are known, were used later in combination with ellipsometry and wave-guide coupler measurement for determination of the SWNT thin film optical constants and thickness.

$$\text{Tran\_Data} = [633\ T]$$

Prism Wave-guide Coupler (633 nm). Prism waveguide coupler measurements were carried out on the SWNT film samples on Pyrex substrate. Similar to the transmission measurement, the reflectance output $R=I_r/I_0$ from the prism waveguide coupler measurement can also be theoretically determined using the generalized Fresnel equations given the optical constants and thickness for each layer.

$$\text{Waveguide\_Data} = \begin{bmatrix} \alpha_1 & R_1 \\ \alpha_2 & R_2 \\ \vdots & \vdots \\ \alpha_n & R_n \end{bmatrix}$$

Combined Method for Determination of Properties of SWNT Thin Film

The data from all three methods was used to determine the thickness of SWNT thin films. In all the measurements, the only unknown parameters are: (1) Thickness of SWNT thin film–d; (2) Refractive index of SWNT thin film–n; (3) Extinction coefficient of SWNT thin film–k.

We used an iterative method with the help of Mathematical software (Matlab) to determine these unknowns by minimizing the difference between the experimentally measured (Ellip_Data Trans_Data Waveguide_Data) and those calculated theoretically on the basis of the generalized Fresnel's equations.

The resulting film thickness was used to calculate bulk conductivity values from sheet resistance values.

The sample prepared on PET was doped using Liquid Method 1 for 30 minutes. The composition, properties before doping, and properties after doping are shown in the Table.

| | Film Composition | | Properties Before Treatment | | After Treatment by Liquid Method 1 for 30 min. | | | |
|---|---|---|---|---|---|---|---|---|
| Dispersion | Volume Fraction SWNTs | Film Thickness (nm) | Sheet Resistance | % T at 550 nm | Sheet Resistance | % T at 550 | Conductivity (S/cm) | % Increase in Sheet Resistance after 120 h air exposure |
| A | 0.10 | ~12 | 71680 | 98 | 2502 | 96 | 333 | 51% |
| A | 0.28 | ~12 | 4247 | 95 | 593 | 94 | 1406 | 38% |
| A | 0.64 | 12 | 1353 | 89 | 297 | 90 | 2764 | 53% |
| B | 0.32 | ~13 | 4685 | 93 | 1321 | 93 | 582 | 50% |
| B | 0.62 | 13 | 1578 | 87 | 448 | 86 | 1668 | 23% |
| A | 0.56 | 22 | 555 | 86 | 185 | 85 | 2503 | 21% |
| B | 0.50 | 33 | 651 | 80 | 237 | 79 | 1275 | 16% |
| A | 0.44 | 35 | 399 | 81 | 119 | 79 | 2429 | 18% |
| A | 0.40 | 59 | 242 | 71 | 81 | 71 | 2107 | 19% |
| B | 0.49 | 86 | 239 | 50 | 66 | 48 | 1781 | 20% |
| B | 0.38 | 87 | 321 | 62 | 89 | 62 | 1287 | 38% |

Conductivity enhancements of up to 7-fold improvement were observed. Greater enhancements are observed for samples close to the percolation threshold, where the sheet resistance is dominated by the volume fraction of conducting nanotubes present.

The observed conductivity enhancement is also related to the stability of the doped structure. Experiments show that samples stored in dry air, such as in a dessicator, exhibit high stability and show little change in sheet resistance with time.

Under humid air conditions, the charge transfer complex is generally less stable. Certain CNT structures can be used to stabilize the charge transfer complex. Stabilization is provided by creating a tortuous path to diffusion within the CNT structure. The addition of junctions, specific bundle morphologies, and thicker films all contribute to stabilization of the structure. Decreasing the overall surface area of the network structure is also advantageous.

Preferred structures for improved stability are films with thickness greater than 20 nm and volume fraction of CNTs greater than 0.40.

Example 7

HiPco SWNT films on glass were prepared according to Film Method 1 described in Example 1. The sheet resistance of the un-treated samples was 670 f/square.

Liquid Treatment 3. The sample was immersed in a 0.02 M solution of Co(II) phthalocyanine in THF for 1.5 h. The sample was removed from the solution, washed with THF, and then immersed in a thionyl chloride liquid for 30 min. After treatment, the sample was washed with methylene chloride and air dried. The sheet resistance of this sample was 208 Ω/square.

Liquid Treatment 4. The sample was immersed in a solution of 0.02 M Co(II) phthalocyanine in $SOCl_2$ for 30 min. After treatment, the sample was washed with methylene chloride and air dried. The sheet resistance of this sample was 162 Ω/square.

Liquid Treatment 5. The sample was immersed in a solution of 1.0 M $AlCl_3$ in $SOCl_{for}$ 1 h. After treatment, the sample was washed with thionyl chloride and then methylene chloride, followed by air drying. The sheet resistance of this sample was 215 f/square.

Comparative Example 1

SWNT-HiPco (CNI, Purified grade) was dispersed in 0.62 wt % SDBS in water and transferred to Mylar using Film Method 2. Samples were treated by placing film in a vial and covering with a small amount of liquid dopant and allowed to sit for 2 h at room temperature. Samples were removed from treatment, washed with $CH_2Cl_2$ and allowed to air dry.

| Sample | Sheet Resistance (After Dry) | Sheet Resistance (After 72 h in humid environment) |
| --- | --- | --- |
| Control | 34,800 Ω/□ | 34,800 Ω/□ |
| Dopant = $SOCl_2$ | 2,500 Ω/□ | 2,800 Ω/□ |
| Dopant = $POCl_3$ | 5,500 Ω/□ | 8,200 Ω/□ |

Example 8

A dispersion of MWNT (<10 nm, Helix) was prepared in dichlorobenzene. Bucky papers were prepared from dichlorobenzene dispersions. The papers were treated with $SOCl_2$ vapor by Gas Treatment 2. After treatment, the sheet resistance of the MWNT bucky paper decreased from 42 Ω/square to 19 Ω/square.

Example 9

Transparent conductive films were prepared from mixtures of SWNT (HiPco, Purified Grade) and MWNT (<10 nm, Helix). Two separate dispersion of either SWNT or MWNT were prepared in 0.62 wt % SDBS in $H_2O$ by tiphorn sonication. Mat were prepared on mixed cellulose ester membranes by first passing a volume of SWNT through, then a volume of MWNT through. CNTs were deposited on PET using Film Method 2.

Alternatively, dispersions were prepared by mixing both SWNT and MWNT during dispersion. The mixture dispersion was deposited on PET using Film Method 2.

| Description | Sheet Resistance (Ω/square) | % T at 550 nm |
| --- | --- | --- |
| 3 mL MWNT then 2 mL SWNT | 456 | 75.0 |
| 3 mL SWNT | 533 | 75.2 |
| 2 mL SWNT then 2 mL MWNT | 602 | 76.2 |
| 4 mL SWNT and MWNT mixed in situ | 690 | 80.1 |

We claim:

1. A method of treating CNTs, comprising:
   providing CNTs, and
   contacting the CNTs with a doping agent, wherein the doping agent comprises an electron
   acceptor or electron donor molecule that forms a charge transfer complex with the CNTs, and further characterized by
   introducing defects into the CNTs such that they decrease the G/D ratio into the range of about 8 to about 20 prior to adding a doping agent.

2. The method of claim 1 comprising exposing the CNTs to UV ozonation.

3. The method of claim 1 comprising treating sequentially with different dopants to achieve preferred depletion levels in nanotubes with different bandgaps.

4. The method of claim 1 wherein the CNTs are in the form of a film having a thickness less than 500 nm.

5. The method of any of claim 4 wherein the CNTs are in the form of a film having a thickness less then 200 nm.

6. The method of claim 1 comprising treating the CNTs with liquid doping agent.

7. The method of claim 1 comprising treating the CNTs with a solution containing at least 60% doping agent.

8. The method of claim 6 comprising contacting the CNTs with liquid thionyl chloride.

9. The method of claim 1 wherein the CNTs are in the form of a film and further wherein the treatment decreases sheet resistance by at least 8 times and the resulting film is air-stable—meaning that its conductivity does not degrade by more than 5% after 1 week of exposure of the treated CNTs to room temperature air.

10. The method of claim 1 wherein the CNTs are in the form of a film and further wherein the treatment decreases sheet resistance by about 10 to about 30 times, and the resulting film is air-stable—meaning that its conductivity does not degrade by more than 5% after 1 week of exposure of the treated CNTs to room temperature air.

11. The method of claim 1 wherein the treatment increases transmittance in the near infrared.

12. The method of claim 1 wherein catalysts to increase the doping effect are preferentially absorbed to the CNTs, and the CNTs are then treated with doping liquid.

13. The method of claim 1 wherein the CNTs are treated by UV light in the presence of oxygen.

14. The method of claim 1 wherein defects are introduced into CNT, such that the G/D ratio is in the range of 14 to 18.

15. The method of claim 1 comprising treating the CNTs with a gaseous dopant.

16. The method of claim 1 comprising treating the CNTs sequentially with multiple dopants.

17. The method of claim 1, further comprising a step of encapsulating the doped CNT structures by overcoating with a polymer.

18. The method of claim 1 wherein the CNTs are contacted with excess doping agent for 10 minutes or less.

19. A film prepared by method of claim 1.

20. The method of claim 1, comprising the step of: exposing the CNTs to oxidative plasma treatment prior to or simultaneous with adding the doping agent.

21. The method of claim 1, comprising the step of: exposing the CNTs to electron beam irradiation prior to or simultaneous with adding the doping agent.

22. The method of claim 1, comprising the step of: exposing the CNTs to a UV treatment prior to the step of contacting the CNTs with a doping agent.

23. The method of claim 1 wherein the doping agent comprises thionyl chloride, phosphoryl chloride, selenium oxychloride, iodine monobromide, aurous chloride, $SO_2$, $CNS)_2$, or $(IrCl6)^{2-}$.

24. The method of claim 1 wherein the CNTs and any glassware or processing equipment is substantially free from moisture and oxygen.

25. The method of claim 1, comprising the step of: using a doping catalyst to catalyze the doping step; and wherein the doping catalyst comprises a metallo phthalocyanine or metal halide.

26. The method of claim 1, comprising the step of: introducing defects into the CNTs such that they exhibit a G/D ratio in the range between 12 and 20 prior to adding a doping agent.

27. The method of claim 23, comprising the step of: introducing defects into the CNTs such that they exhibit a G/D ratio in the range between 14 and 18 prior to adding a doping agent.

* * * * *